United States Patent [19]
Angelbeck et al.

[11] 3,825,845
[45] July 23, 1974

[54] PARALLEL OPTICAL STAGE LASER SYSTEMS

[75] Inventors: Albert W. Angelbeck, Manchester; George R. Wisner, Deep River, both of Conn.

[73] Assignee: United Aircraft Corporation, East Hartford, Conn.

[22] Filed: Feb. 14, 1973

[21] Appl. No.: 332,946

[52] U.S. Cl............ 330/4.3, 332/7.51, 331/94.5 A, 250/199
[51] Int. Cl............................................. H01s 3/10
[58] Field of Search.................... 330/4.3; 332/7.51; 250/205, 199; 331/94.5 C, 94.5 A, 94.5 Q; 350/160

[56] References Cited
UNITED STATES PATENTS

| | | | |
|---|---|---|---|
| 3,459,466 | 8/1969 | Giordmaine | 350/160 |
| 3,496,487 | 2/1970 | Soffer et al. | 331/94.5 Q |
| 3,588,738 | 6/1971 | Goodwin | 331/94.5 C |

Primary Examiner—Richard A. Farley
Assistant Examiner—N. Moskowitz
Attorney, Agent, or Firm—Anthony J. Criso

[57] ABSTRACT

Disclosed are laser amplifier systems for producing unlimited amounts of laser power having controllable frequencies and good optical qualities. A source of controllable frequency coherent energy is directed through a plurality of parallel optical channels, each of which contains laser power amplification means. The outputs from the parallel channels are combined spatially parallel to form a system component laser output having an aligned phase front. A sample beam is taken from each amplification channel and is processed with a phase sensitive optical detector to produce suitable error signals which are used to vary the optical pathlengths of the system necessary to align the phase fronts. In addition, an autoalignment or a phase measurement technique maintains the spatial parallelism in the output.

14 Claims, 6 Drawing Figures

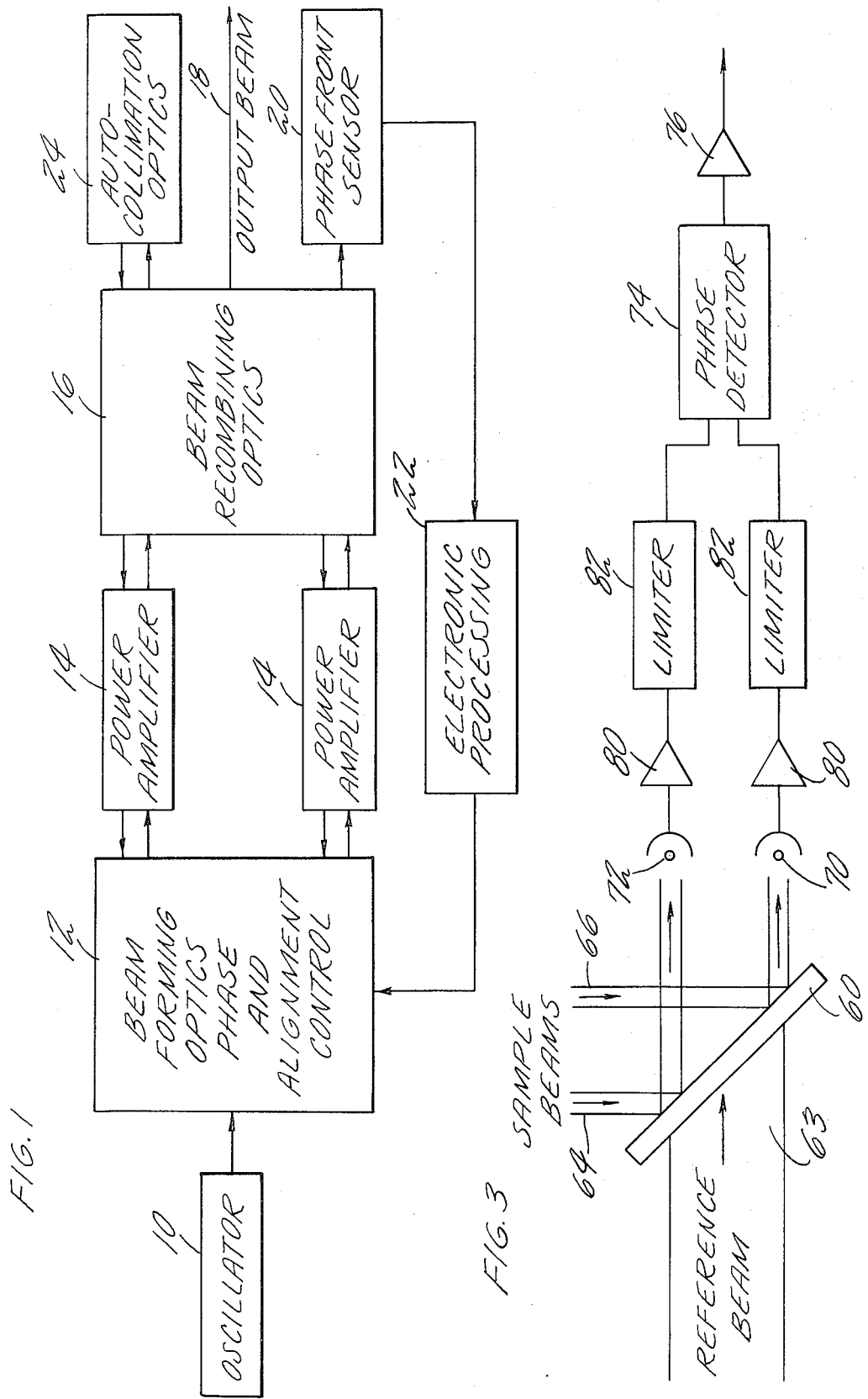

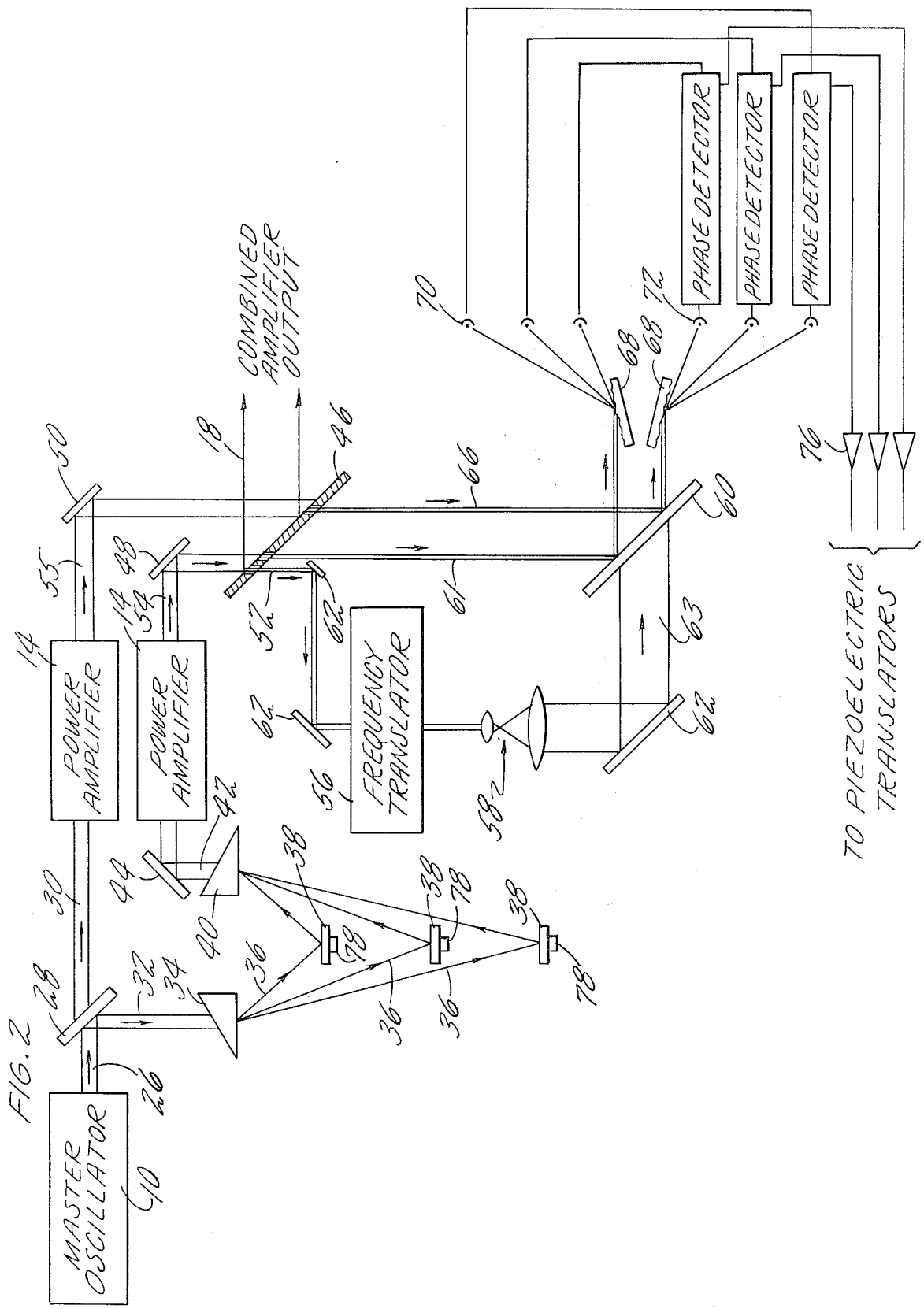

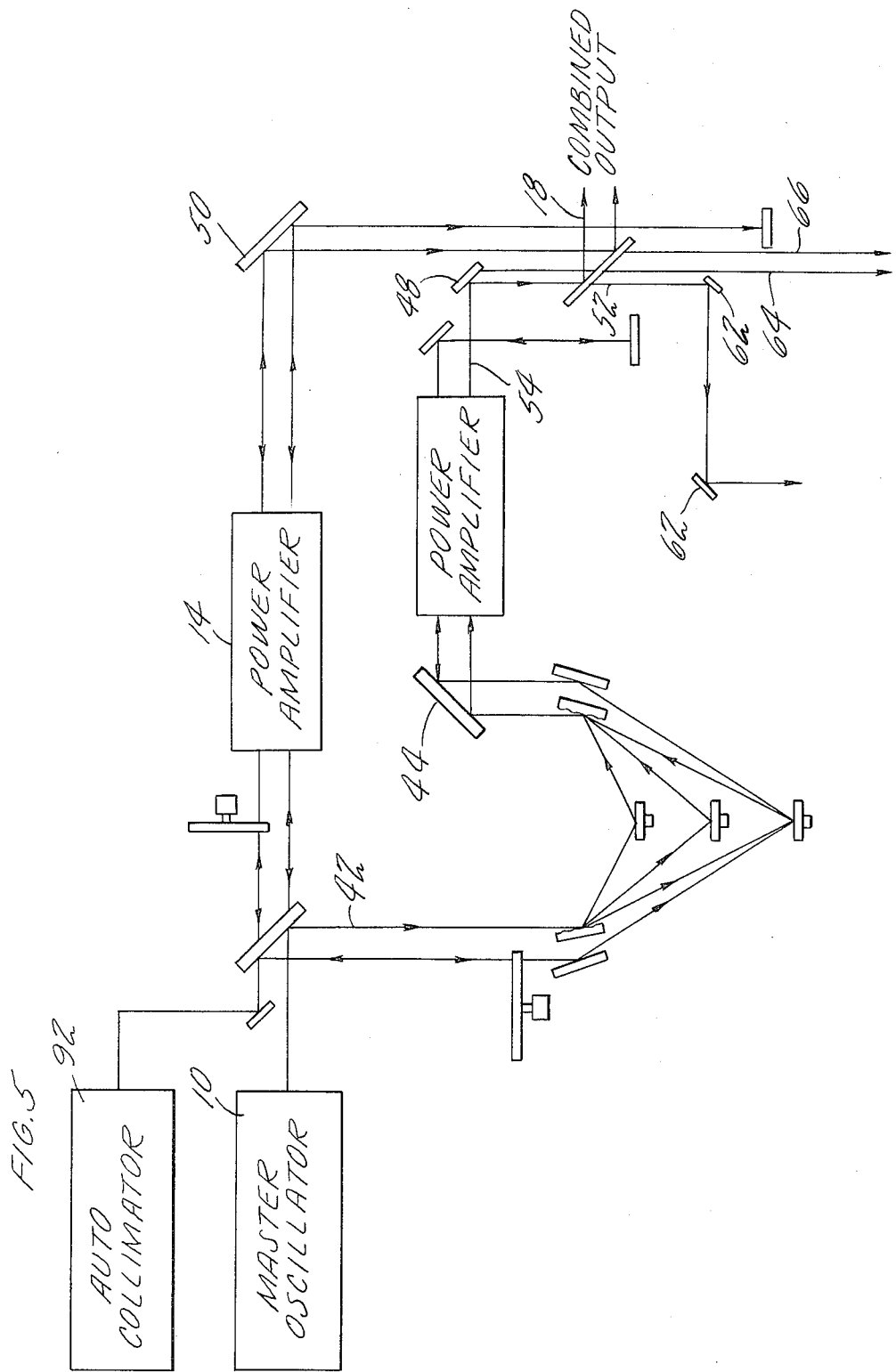

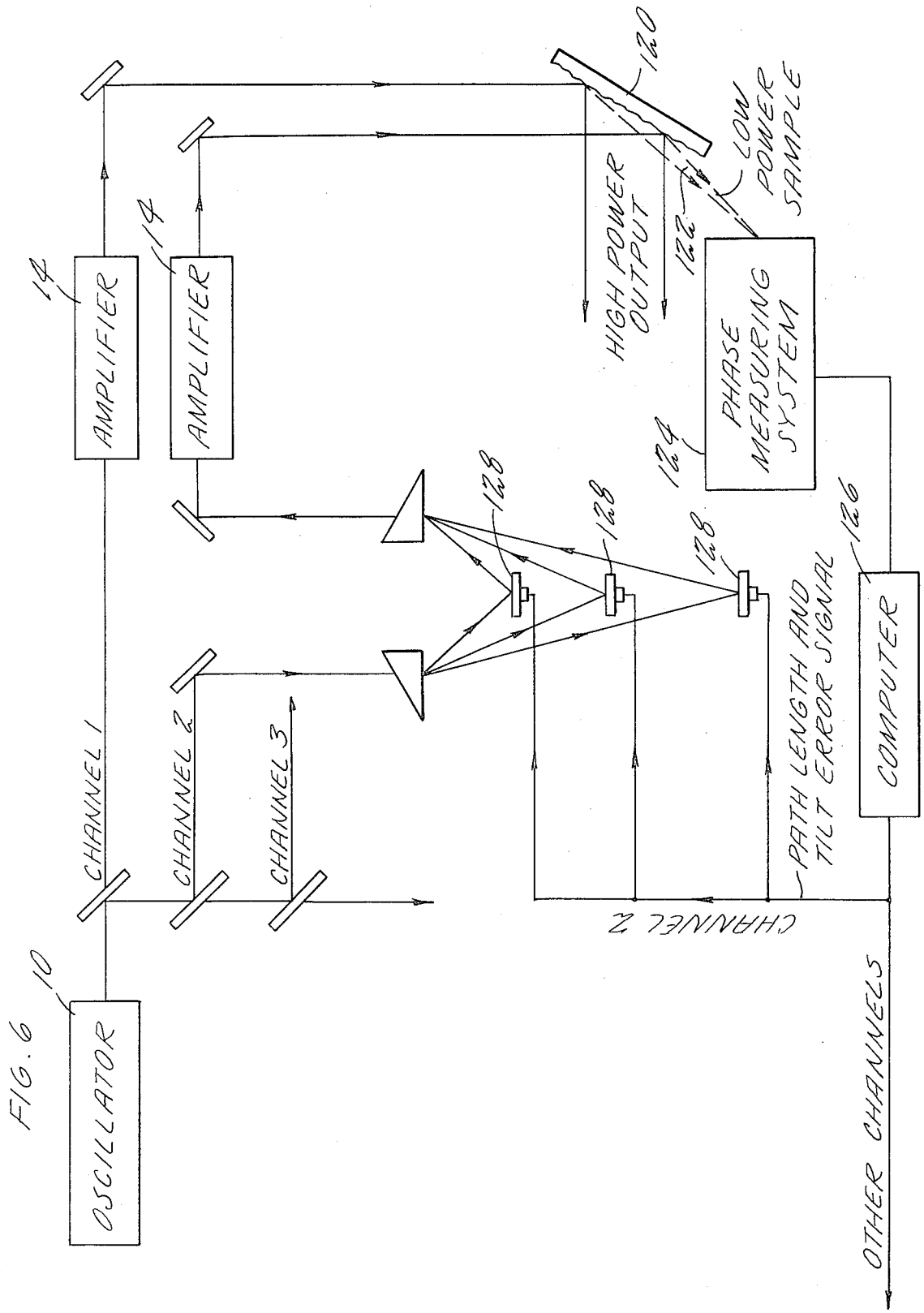

PARALLEL OPTICAL STAGE LASER SYSTEMS

BACKGROUND OF THE INVENTION

1. Field of Invention

This invention relates to lasers and more particularly to laser systems in which the individual outputs from a plurality of laser sources are combined to form a laser output having good optical quality and high power. The invention herein described was made in the course of or under a contract or subcontract thereunder with the Department of the Air Force.

2. Description of the Prior Art

The continuing expansion occurring in the field of laser technology has created an unsatisfied demand for higher power laser systems than are currently available. Gas lasers, and in particular chemical gas lasers, are potentially the best types of devices for producing high power laser radiation. However, even chemical lasers are limited in size and power due primarily to the large, small signal gain characteristic of such devices as well as the short optical extraction length along the direction of flow which results from the fast relaxation times of the active species involved. In addition, many systems are power limited because of the density of the optical flux on the reflecting surfaces in the laser energy generating mechanism.

Various efforts have been made to avoid the limitations of singular laser devices by combining several units with optically parallel paths in the region where the laser energy is being produced and amplified, and then combining the yield from each parallel path into one combined output beam. This approach is conceptually simple, however, alignment of each of the parallel paths so that their respective output beams are in fact parallel and the maintenance of phase front alignment amongst all of the outputs from the various parallel paths has been found difficult to implement. Some techniques have been investigated in which an attempt is made to eliminate all mechanical motion between the various components of the laser generating system in order to maintain the required spatial parallelism and phase front alignment. A high degree of stability is required and passive systems which rely on the elimination of mechanical motion between components within the system have been found to be impractical in large scale devices. Even presuming that an adequate mechanical stabilization technique were available, this type of passive interlocking and control has no way of compensating for phase front alignment and directional poining between the various parallel stages when spurious temporal and spatial anomalies occur in the gain media within the individual parallel laser channels.

SUMMARY OF THE INVENTION

A primary object of the present invention is to produce laser energy at high power from a source of relatively low power coherent energy which is enhanced in a plurality of laser amplifiers that are arranged with optically parallel paths.

Another object is to produce a laser energy which is made up of a plurality of contributing sources, each source having spatially parallel alignment with respect to a common axis, and the phase front of each source being aligned with respect to the phase front of each of the other sources.

According to the present invention, coherent laser energy is passed through a plurality of laser power amplifiers arranged in optically parallel paths; closed loop servo systems maintain spatial parallelism between the outputs from the amplifiers and the outputs are combined into a single output having an aligned phase front. In one embodiment, a primary source of laser energy is divided into component beams with suitable beam splitting devices, amplified and recombined into a composite beam comprised of spatially parallel components having aligned phase fronts: the spatial parallelism and the phase front alignment of the component beams are controlled by suitable servo systems. In applications having a high power requirement, power amplifier devices are located in each of the individual split beam paths, and if the source of coherent energy into the amplifiers is a multi-wavelength source, dispersion elements are inserted into the beam paths. A directional alignment of the component beams is controlled with error signals provided by either a phase measurement technique or an autoalignment technique, the error signals being directed into servo-driven mirrors in each of the component beam paths. The phase front alignment is accomplished with an optical detector which intercepts a sample of the recombined beam to provide a measurement of any phase differences between the component beams by optical heterodyning techniques, and a suitable compensating pathlength difference is provided to the component beams being controlled.

A primary advantage of the present invention is the ability to produce a beam of laser energy having a power far in excess of that which is available from a single optical cavity. In addition, the output power from the system can conceivably be increased without limit by simply adding additional power amplification channels. Further, the present invention can amplify a coherent source of energy comprised of a plurality of wavelengths.

One characteristic feature of the present invention is the output beam which is comprised of multiple contributing beams, each of which is aligned parallel to a common axis. Also, the phase front of each component beam is controlled so that the overall composite output beam has a predetermined coordinated phase profile. In addition, this invention is characterized by the active control of the phase relationship between the various parallel channels through the amplifier devices, the active control being bandwidth limited only by the capacity of the actuators used. Further, implementation of the present invention permits directional steering of the overall composite output beam from the system.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a simplified, block diagram of a two parallel channel, laser system in accordance with the present invention;

FIG. 2 is a simplified schematic diagram of an optical beam phase correction system in accordance with the present invention;

FIG. 3 is a simplified schematic diagram showing in greater detail a typical optical phase difference measurement system for use in the system shown in FIG. 2;

FIG. 5 is a simplified schematic diagram of an overall embodiment of the present invention showing both phase correction apparatus and beam autocollimation apparatus; and FIG. 6 is a simplified schematic diagram of an alternate embodiment of the present invention in which the spatial phase front of the output beam is interrogated for both phase and alignment correction.

DESCRIPTION OF PREFERRED EMBODIMENTS

Figure 4:
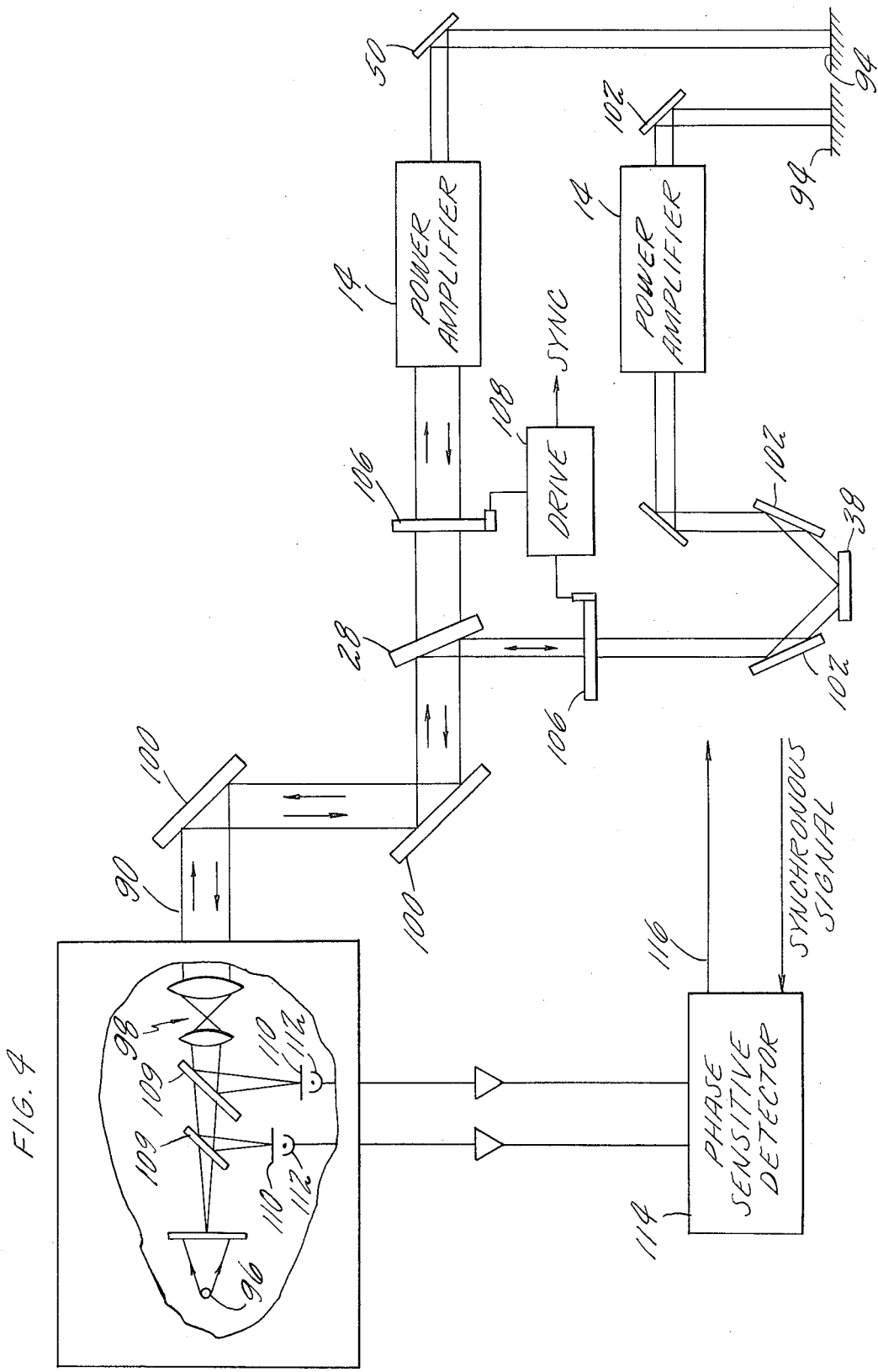
FIG. 4 is a partially broken-away, simplified schematic diagram of a typical multiplexed autocollimation system for use in the apparatus shown in FIG. 2.

The simplified block diagram shown in FIG. 1 provides a pictorial representation of the functional interrelationship between the major components of one embodiment of the present invention. A master oscillator 10 generates various frequencies of laser energy which are passed through a beam forming optics arrangement 12 that provides an input for each of the power amplifiers 14 arranged in optically parallel channels. The amplifier outputs are combined adjacent to one another to form an output beam 18 in a beam combining optics arrangement 16. A sample beam from the output of each power amplifier is directed into a phase front sensor 20 with produces suitable phase controlling signals with an electronic processing unit 22 that feeds back to the beam forming optics arrangement 12. In addition, a separate beam is passed through the beam forming optics arrangement 12, each of the power amplifiers, and up to the beam combining optics with suitable auto-collimation optics 24 to produce a suitable feedback signal that passes through the parallel optical channels and back to the optics arrangement 12 to control the relative alignment between each of the optical channels through the system. As a matter of convenience, the apparatus is discussed in terms of a master oscillator which provides laser energy at three different frequencies simultaneously, and the energy is amplified in two parallel optical channels. Obviously, the principles involved can be applied to systems having any number of individual frequencies and parallel channels. Two fundamental requirements of the present invention are that all energy at any given frequency must have a suitable phase relationship when the individual contributions from each parallel optical channel are collected in the one output beam and that the angular direction of the output energy from each parallel channel must be aligned with respect to a common axis.

The maintenance of phase alignment of the laser energy at each distinct frequency in the multiple parallel channels in which laser power amplification takes place is accomplished by actually monitoring the phase difference between the parallel beam at each frequency to provide an error signal for individual control of the phase of each frequency. When the system involves more than two parallel channels, one common reference channel is used. In the system described herein, the optical pathlength can vary with the frequency, and the phase correspondence between the parallel channels is controlled; the pathlength for each frequency in a given optical channel can be and is different by an integer number of wavelengths consistent with the coherence length of the laser. Referring to FIG. 2, which shows a typical system for controlling the phase of each frequency component in the output from two amplifier stages, the master oscillator 10 provides a controllable frequency output 26 which is a source wherein the frequency is stabilized to the line center of the gain profile of each line of operation. The output 26 is divided by a first beam splitter 28 into a first split beam 30 and a second split beam 32. The second split beam passes through a first dispersive prism 34 and is divided into single wavelength beams 36, each of which is reflected off a corresponding fully reflecting mirror 38 toward a second dispersive prism 40 in which the single wavelength beams are combined as a reformed beam 42. The reformed beam is directed through the power amplifier by a first corner mirror 44 which is directionally controllable and then directed toward an output mirror 46 by a second corner mirror 48 as an amplified reformed beam 54. The first split beam passes through the power amplifier and is directed toward the output mirror 46 as an amplified first beam 55 by a third corner mirror 50 which is directionally controllable. The amplified first beam and the amplified reformed beam are brought together adjacent to one another and are formed into the output beam 18 by the output mirror. A reference sample 52 is taken from the amplified beam 54, passed through a frequency translator 56, a beam expander 58 and directed through a second beam splitter 60 by the frequency translator mirrors 62 as a frequency shifted reference beam 63. Obviously, the reference sample need not necessarily be taken from the amplified beam; any stable frequency source such as one taken directly from the master oscillator is suitable. First and second sample beams 64, 66 are taken from the amplified reformed beam 54 and the amplified first beam 55 respectively, directed to the beam splitter 60 and then to diffraction gratings 68. Sample detectors 70 and reference detectors 72 feed electrical signals to phase detectors 74 which provide error correction signals to a signal amplifier 76 the output of which is fed to piezoelectric transducers 78. When the optical system is generating a change so rapidly that the piezoelectric elements are unable to provide the necessary pathlength changes fast enough, alternate mechanisms such as electro-optic phase modulators utilizing such materials as gallium arsenide are necessary.

In addition to the output beam 18, the apparatus shown in FIG. 1 provides the first and second sample beams which are heterodyned against the frequency shifted reference sample to provide an indication of the relative phase of the laser energy at a given frequency in each of the parallel channels. This optical phase measurement technique is basically a two-beam interferometer which produces fringe patterns that are monitored electronically. Assuming the master oscillator is a chemical laser using either hydrogen fluoride or deuterium fluoride as the gain medium, the wavelength of the laser energy is nominally 2½ to 4 microns. The carrier offset frequency introduced by the frequency translator 56 is between 1 and 40 MHz. Referring to FIG. 3, the first and second sample beams 64, 66, each of which is a low power laser signal, impinge on the second beam splitter 60 and are redirected toward a sample detector 70 and a standard detector 72. Since each of the sample beams is taken from one of the parallel optical channels at the output mirror 46, an analysis of the phase information in the sample beams describes the phase content of the output beam. Any phase difference between the first sample beam and the second sample beam corresponds to a phase mismatch in the combined output beam from the parallel channel amplifier system. The frequency of the reference beam is equal to the frequency of the amplified reformed beam suitably offset by the frequency translator 56. Therefore, when the reference beam is optically heterodyned with the sample beams as is shown in FIG. 3, temporal varying interference patterns are formed on the detectors. These interference patterns result in an electrical carrier signal at the offset frequency and the phase relationship between the signal from the arbitrarily designated reference detector and the signal from the sample detector corresponds directly to the phase difference between the two sample beams. These signals are passed through matching preamplifiers 80 and then through limiters 82 which normalize their amplitude thereby eliminating any effect from an intensity difference which may be present in the sample beams being compared. The outputs from the limiters are applied to the phase detector 74 which produces a signal that is proportional to the phase difference between the two sample beams. This signal is amplified in the amplifier 76 and directed back to the piezoelectric transducer and any desired change in the phase relationship between the laser energy at a given wavelength is accomplished by a translation of the appropriate mirror 38 induced by a suitable motion of the appropriate transducer 78.

The primary function of the autocollimation system is to provide suitable parallelism between the various amplification channels such as the two-channel system shown in FIG. 2. The automatic collimator corrects for misalignment between each of the amplifier legs in the system, and the only additional phase correction required is an adjustment of the entire phase front of one of the frequencies in the appropriate amplifier channel. The automatic alignment system described herein is shown in FIG. 4. Essentially, an alignment beam 90 from a two-axis electronic autocollimator 92 is alternately transmitted through the two amplifier optical channels and reflected back from the reference mirror 94 to produce a signal which nulls the output from the collimator and automatically adjusts one mirror in each optical channel to compensate for misalignment between the parallel channels. In the autocollimator, a light source 96 projects a reticle pattern through a collimating telescope 98. The reticle is reflected by the corner alignment mirrors 100, divided at the beam splitter 28 and passed through each amplifier channel along an optical path which is adjacent to but not coincident with the laser beams passing through these channels and defined by fixed alignment mirrors 102, the movable alignment mirrors 44, 50 and the fully reflecting mirror 38. The alignment beam does not pass through the dispersive prisms 34, 40. A pair of synchronized choppers 106 cause the alignment beam to be transmitted alternately through each amplifier channel; the choppers have a common synchronized drive 108. The reticle pattern in the alignment beam is projected through the parallel amplifier channels, reflected off the reference mirrors 94 and back through the optical system to the collimator beam splitters 109 which reflect the return signal through detection reticles 110 and onto collimator photoelectric detectors 112. The return signal and the projected reticle form a pattern on the detectors and an electronic signal is fed to an alignment phase sensitive detector 114 which provides suitable mirror control signals 116 which are fed to the movable mirrors 44, 50. The synchronization of the beam choppers 106 is transmitted to the phase detector 114 so that a suitable correlation of the electronic signals from the optical detectors 112 is possible.

A composite diagram of the high power laser optical path including both the optical beam phase correction system and the autocollimation system is shown in FIG. 5. Although many of the corner mirror arrangements appear schematically as entirely separate entities, these mirrors are mounted as an integral unit and are in fact an alignment mirror and a laser mirror attached to a common mounting system.

The above discussion is based on a laser system having a common master oscillator which drives two parallel channel amplifiers. An alternative embodiment involves replacing the master oscillator with two control oscillators which are frequency locked together. In addition, the system is described basically in terms of a hydrogen fluoride or deuterium fluoride chemical laser; obviously, the present invention is equally applicable to other chemical lasers and nonchemical lasers as well.

The alignment beam is propagated parallel to the oscillator output beam and is divided into two paths by the same beam splitter as is the oscillator output. The divided alignment beam is modulated by the synchronized mechanical choppers and produces a duplexed signal for the single autocollimator. An alternative alignment arrangement involves the use of two independent autocollimators, one for each path; however, the alternative embodiment is less precise because each automcollimator has characteristic internal operating errors which are different from the other.

In FIG. 2 the second split beam is shown being separated into its component frequencies and then recombined by dispersive prisms 34, 40. Any dispersive element is suitable for this purpose, such as the prism shown in the same location in FIG. 5. Alternatively, several prisms in series may be used in each location for greater spatial dispersion. Similarly, the sample beams are shown being resolved into their component frequencies by diffraction gratings 68 in FIG. 2; any suitable diffracting devices can be used.

In the systems described thus far, such as those shown in FIGS. 1-5, phase is monitored for each frequency of interest by taking a sample from each amplified beam through a small aperture in the output mirror. These systems perform satisfactorily as long as the individual beams are nearly uniphasal since any angular tilt in the wavefront of each beam is controlled by the autoalignment system. However, in each optical channel the optical paths of both the amplified laser beam and the alignment beam must be established and maintained parallel to one another. In practice, the initial path of the alignment beam is set by boresighting the alignment beam along the optical path of the power amplification beam in each parallel channel.

FIG. 6 shows an alternate phase measurement technique that allows for minimization of the phase front distortion of the combined beam as well as for compensation of phase front distortion in each of the beams being combined. The primary distinction between the embodiment shown in FIG. 6 and the embodiments previously described is that a low power sample beam which is an exact replica of the high power output beam is monitored for phase information to provide suitable pathlength and mirror tilt error signals. These signals are provided at each frequency of concern which exists in the laser output and the signals are fed to movable mirrors as follows. A high power beam sampler 120 produces low power output sample beams 122 from the combined beams forming the high power system output. The sampler is preferably a weak diffraction grating although a hole diffraction grating in a mirror surface or an acoustic diffraction grating are also suitable. The low power sample is monitored in a scanning phase measurement system 124 using an optical scanner which provides a raster scan of the spatial phase front of the low power sample. By the use of appropriate electronic techniques, phase is measured across the entire beam in a manner which accounts for large phase shifts, including shifts in excess of 180°. The scanning phase measuring system provides beam phase information which is correlated with precision to known locations in the beam front. The phase information processed using a real-time digital computer 126 to provide tilt and pathlength error signals which actuate appropriately controllable mirrors. The error signals are generated within the computer by an analysis which compares the phase monitored with the desired uniphasal wavefront. The laser beams in the individual amplifier channels as well as the composite high power output beam can be steered by appropriate phase and tilt adjustments of the individual frequency, movable mirrors 128. If multisegment or deformable mirrors are implemented in each of the amplifier trains, correction for small localized phase front distortions is also feasible.

Although this invention has been shown and described with respect to preferred embodiments thereof, it should be understood by those skilled in the art that various changes and omissions in the form and details thereof may be made without departing from the spirit and scope of the invention.

Having thus described typical embodiments of our invention, that which we claim as new and desire to secure by Letters Patent of the United States is:

1. A laser system comprising:
   means for providing controllable frequency laser energy;
   means for amplifying the power of the laser energy in optically parallel amplification channels;
   means for combining the individual laser beams from each amplification channel into a system output beam which comprises the individual laser beams combined adjacent to one another;
   means for extracting a sample beam from each of the individual beams;
   means for determining the phase relationship of the laser energy at a given frequency and the direction of propagation of the individual beams from the sample beams; and
   means for adjusting the phase relationship between the individual beams and the direction of propagation of the individual laser beams.

2. The invention according to claim 1 wherein the controllable frequency laser energy comprises a plurality of sources which are frequency locked.

3. The invention according to claim 1 including means for dividing the controllable frequency laser energy into a plurality of controllable frequency laser energy sources.

4. The invention according to claim 3 including means for splitting one of the plurality of controllable frequency laser energy sources into additional controllable frequency sources.

5. The invention according to claim 1 wherein the controllable frequency laser energy source comprises laser energy having a plurality of distinct frequencies.

6. The invention according to claim 5 including additionally:
   separation means for dispersing the controllable frequency laser energy source into individual optical paths each of which corresponds to one of the distinct frequencies of the laser energy; and
   recombination means for recombining the laser energy at each frequency coming from each optical path into a single recombined beam.

7. The invention according to claim 1 wherein the extraction means comprises a grating that provides a low power sample which is a replica of the higher power system output beam.

8. The invention according to claim 1 wherein the means for determining the phase relationship in the direction of propagation of the individual beams includes:
   an optical scanner which is capable of providing a raster scan of the spatial phase front of the low power beam sample;
   means for optically heterodyning the reference beam and the sample beams;
   optical detectors for sensing the interference pattern produced by the heterodyning, the detectors producing corresponding first electrical signals;
   electronic amplifiers for enhancing the intensity of the first electrical signals;
   limiters for limiting the enhanced first electrical signals;
   a phase detector for comparing the output from two such limiters and providing a second electrical signal;
   electrical circuitry for recording phase excursions greater than one hundred and eighty degrees which occur in the enhanced first electrical signals;
   means for processing the second electrical signal to generate control signals for alignment and phase adjustment; and
   means for enhancing the control signals.

9. The invention according to claim 6 wherein the means for adjusting the phase relationship and the direction of propagation of the individual laser beams comprises movable mirrors located in the individual optical paths between the separation means and the recombining means.

10. A laser system comprising:
    means for providing controllable frequency laser radiation;
    amplification means for increasing the power of the laser radiation in a plurality of amplifier channels which are optically parallel to each other;
    means for combining the individual laser beams from each amplification channel into a system output beam which comprises the individual laser beams combined adjacent to one another;
    means for extracting a sample from each of the individual beams;

means for determining the relative phase at a given frequency of the laser energy in the individual beam samples;

means for adjusting the phase relationship between the individual beams;

means for determining the relative direction of propagation of the individual beam samples; and means for adjusting the direction of propagation of the individual laser beams.

11. The invention according to claim 10 wherein the means for extracting a sample from each individual beam is an aperture in a fixed mirror positioned in the path of the system output beam.

12. The invention according to claim 10 wherein the means for determining the relative phase of the laser energy at a given frequency in a sample beam comprises:

means for providing a controllable frequency reference beam of laser radiation;

means for optically heterodyning the frequency beam and the same beam;

optical detectors for sensing the interference pattern due to the heterodyning, the detectors producing corresponding electrical signals;

electronic amplifiers for enhancing the intensity of the first electrical signals;

limiters for limiting the enhanced electrical signals;

a phase detector for comparing the output from two such limiters and providing an electrical control signal; and means for enhancing the electric control signal.

13. The invention according to claim 10 wherein the means for adjusting the phase relationship between the individual beams are responsive to the electrical control signal and change the pathlength for the radiation at a given frequency in one of the split beam paths.

14. The invention according to claim 10 wherein the means for determining the relative direction of propagation of the individual beam samples comprises:

autocollimation means which provides an alignment beam containing a reticle pattern;

optical means which form an alignment beam path from the autocollimator, through each of the parallel optical channels and back to the autocollimator, the alignment beam path being essentially aligned with but separate from the individual laser beam paths;

means for sequentially transmitting the alignment beam along each alignment beam path; and means responsive to signal from the autocollimator for tilting at least one mirror in each amplifier channel.

* * * * *